3,224,683
FOUNT AERATOR
Joseph Morreale, P.O. Box 216, Spring Grove, Ill.
Filed Jan. 28, 1964, Ser. No. 340,613
1 Claim. (Cl. 239—456)

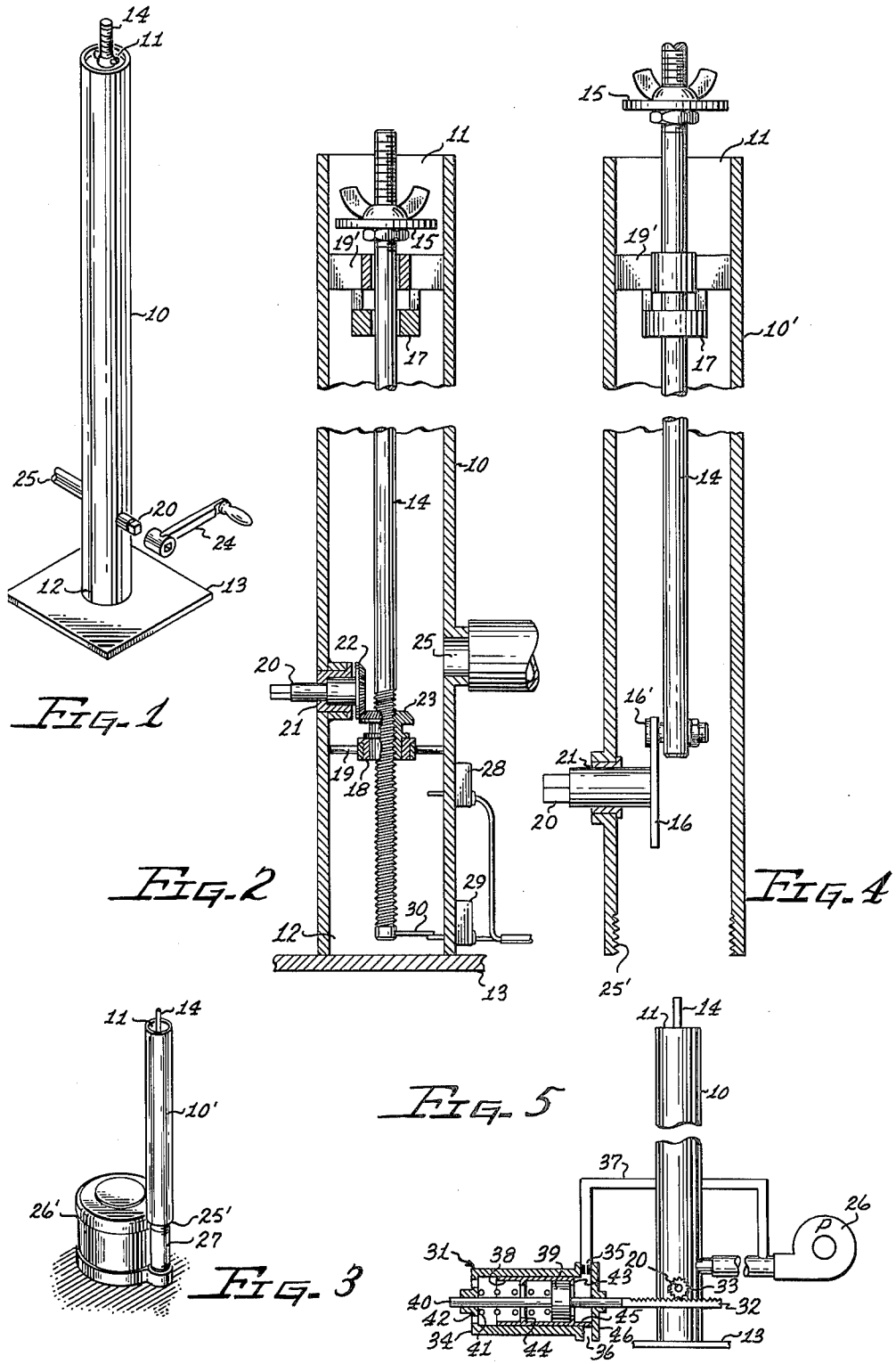

This invention relates to a water display device and more particularly to fount aerators for aerating bodies of water such as ponds, pools, raceways, rivers, lakes and the like.

One of the problems in rearing fish is maintaining the ponds, lakes and streams aerated so that the fish will have a healthful environment in which to grow. Rearing ponds particularly should be aerated to eliminate stagnation and to release harmful gases trapped in the water. At the same time oxygen must be properly introduced into the water so that fish of all sizes such as one day old fry or matured fish can survive. Further, it is desirable at times to prevent or substantially reduce the freezing over of certain bodies of water through aeration to prevent "winter kill" of fish which occurs by excluding oxygen from the surface of the water.

In ponds, pools or streams used for ornamentation or bathing the water should be aerated so that it can retain its fresh, healthful and pleasant look thereby maintaining its attractive appearance. In warm climates swimming pools need to be aerated in order to cool the water and should be aerated in a manner causing the least amount of water loss through evaporation.

In accordance with the invention claimed a new and improved fount aerator is provided comprising in combination a cylindrical housing having an open end. Means are provided for mounting the housing on its other end in a body of water so that the longitudinal axis of the housing is vertically arranged. A shaft is moveably mounted within the housing and supports a deflection plate arranged transversely to the longitudinal axis of the shaft adjacent the open end of the housing for movement with the shaft. Means are provided for selectively actuating the shaft to move the plate and shaft longitudinally of the housing. Pump means are provided for forcing water into the housing, past the deflection plate and out of the housing thereby deflecting the water into various displays depending on the position of the plate relative to the housing.

It is, therefore, one object of this invention to provide a new and improved fount aerator.

Another object of this invention is to provide a new and improved fount aerator which can be adjusted to provide various water spray designs.

A further object of this invention is to provide a new and improved fount aerator which automatically provides through cyclic operation various water spray designs.

A still further object of this invention is to provide a new and improved fount aerator which can be readily adjusted for either a fine water spray or a large volume water flow.

A still further object of this invention is to provide a new and improved fount aerator which provides automatically during each cycle of operation both a fine water spray and a large volume water flow.

A still further object of this invention is to provide a new and improved device for aerating water which aids in preventing freeze over under certain climatic conditions and cools the water under other climatic conditions.

Other objects and advantages of this invention will become apparent from the following description when read in connection with the accompanying drawing, in which:

FIG. 1 is a perspective view of one embodiment of a fount aerator embodying the various features of the present invention;

FIG. 2 is a cross sectional view of a modification of the fount aerator structure shown in FIG. 1 illustrating the gearing mechanism for raising and lowering the deflection plate;

FIG. 3 is a perspective view of a modification of the structures shown in FIGS. 1 and 2 with the fount aerator shown mounted on an electric pump;

FIG. 4 is a cross sectional view of the fount aerator shown in FIG. 3; and

FIG. 5 is a view partly in cross section of a modification of the structure shown in FIGS. 1–4 wherein the deflection plate is cyclically raised and lowered automatically.

Referring more particularly to the drawing by characters of reference FIGS. 1–2 illustrate a fount aerator for use in large or small ponds, pools, raceways, rivers, lakes or the like for aerating the water. The aerator comprises a hollow cylindrical housing 10 having an open end 11 and a closed end 12. End 12 is closed by a plate 13 which forms a base or support when the housing is placed on its closed end on the bottom of a body of water. The cylindrical housing 10 may be formed of any suitable material such as plastic, metal, glass and the like which will stand the internal force of the water under pressure as well as the water's corrosive effects.

A shaft 14 is rotatably mounted within housing 10 and is arranged to extend coaxially with the longitudinal axis of the housing. A deflection plate 15 is fixedly attached to shaft 14 for rotation therewith and is arranged to extend laterally of the shaft within housing 10 adjacent the housing's open end 11. The deflection plate 15 is arranged to cooperate with the inside periphery of the cylindrical housing 10 to form a valve. In its valve seating or restrictive position deflecting plate 15 may close or substantially close the open end of housing 10 or it may be so arranged in housing 10 so as to provide a minimum flow and deflection of the water under pressure out of housing 10.

As shown in FIG. 2 shaft 14 is supported at each end by suitable bearing structures 17 and 18 which are secured to the interior of housing 10 by suitable web like arms 19, 19', respectively, which support the bearing structures axially of housing 10 but permit a substantial unobstructed flow of water therepast.

In order to position deflection plate 15 at various positions relative to the open end 11 of housing 10 in order to vary the flow display of the water leaving this end of the housing, shaft 14 is threadly arranged within bearing 18. Thus, upon the rotation of shaft 14 the deflection plate will be moved axially of housing 10.

In order to move deflection plate 15 axially of housing 10, means are provided adjacent the lower end of the housing to rotate the shaft upon actuation thereof. Shaft 14 may be rotated manually or automatically as the case may be from a point either immediately adjacent the housing or at a remote point therefrom such as the edge of a pool or the shore of a pond.

As shown in FIGS. 1 and 2 shaft 14 is actuated by a shaft 20 one end of which is mounted in a bearing 21 in the wall of housing 10. Shaft 20 is arranged to extend laterally of housing 10 and is provided with a ring gear 22 at its end within housing 10. Gear 22 is disposed in meshing engagement with a gear 23 which is mounted around shaft 14. Shaft 14 is arranged in threaded engagement with gear 23 so that upon rotation of gear 23 shaft 14 will be actuated axially of housing 10 in one direction or the other depending on the direction of rotation of shaft 20.

In FIG. 1 handle 24 is shown for rotating shaft 20. This handle may be placed on shaft 20 immediately adjacent housing 10 or it may be applied to shaft 20 through any suitable extension means such as a bar or flexible cable and actuated in a well known manner from a point remote therefrom.

In order to provide a stream of water through housing 10 and out of the open end 11 thereof past the deflection plate 15, water under pressure is connected to inlet port 25 of housing 10. Inlet port 25 of housing 10 may be connected to a suitable pump such as pump means 26 shown in FIG. 5 which may be connected to housing 10 as shown or arranged at the bottom of the pond, river or lake at a point remote therefrom. Inlet port 25 also may be connected, if so desired, to a separate source of water under pressure such as a well or city water main.

FIGS. 3 and 4 illustrate a modification of the structures shown in FIGS. 1 and 2 wherein housing 10' of the aerator structure is threadedly mounted on a suitable pump means 26'. Pump means 26' forms the base for mounting the aerator fount on the bottom of a body of water. FIG. 4 is a cross sectional view of housing 10' showing the deflection plate 15 outside of the housing in its valve open position. The structure shown in FIG. 4 differs from the structure shown in FIG. 2 by the elimination of the gearing arrangement of FIG. 2 and the replacement of it by a lever arm 16. Lever arm 16 is fixedly attached to shaft 20 for rotation therewith and rotatably attached at one end to a bolt 16' transversely arranged through the lower end of shaft 14. Upon rotation of shaft 20, shaft 14 and deflection plate 15 are moved in a given manner longitudinally of housing 10'. The structure shown in FIG. 4 is preferred over that shown in FIG. 2 if lake water is pumped through the structure. Lake water may contain leaves and other foreign matter which could plug up the gears causing a servicing problem. Further, the structure shown in FIG. 4 may be more economically produced than the gearing arrangement shown in FIG. 2. As shown in FIGS. 3 and 4 the water inlet port 25' of housing 10' is threadedly connected to the water outlet pipe 27 of pump means 26'.

In order to provide cyclic operation of shaft 14 and in turn deflection plate 15 an electric motor (not shown) may be connected to shaft 20 for rotation thereof. The direction of rotation of the electric motor may be controlled and changed by a pair of switch mechanisms 28 and 29 mounted on housing 10 and symbolically shown in FIG. 2. These switches are sequentially actuated by an arm member 30 arranged to extend laterally from shaft 14. When shaft 14 reaches the upper limit of its movement arm member 30 engages switch mechanism 28 causing the current flow through the electric motor to be reversed. Reversal of the direction of current flow through the electric motor by switch mechanism 28 causes clockwise rotation of shaft 14 and the lowering of the deflection plate 15. When shaft 14 reaches its lowermost position arm member 30 engages switch mechanism 29 causing current flow through the electric motor to be reversed again. This reversal of the direction of current flow through the electric motor causes counterclockwise rotation of shaft 14 and the raising of deflection plate 15. Thus, as shown in FIG. 2 a cyclic movement of shaft 14 and deflection plate 15 may occur with the resulting cyclic changing of the water flow or display out of the open end 11 of housing 10, providing water under pressure is directed into housing 10 through the inlet port 25.

FIG. 5 illustrates a modification of the structure shown in FIG. 2 wherein a dual acting fluid motor 31 is utilized to cyclically operate shaft 14 and deflection plate 15 through the intermediary of a rack gear 32. Rack gear 32 is in meshing engagement with a gear 33 which is fixedly attached to shaft 20. Fluid motor 31 comprises a cylinder 34, having an inlet port 35 and an outlet or exhaust port 36. Inlet line 37 which interconnects pump means 26 and inlet port 35 is utilized to furnish cylinder 34 with water under pressure. A sleeve 38 is arranged within cylinder 34 for movement axially thereof. A piston 39 and piston rod 40 are arranged within sleeve 38 for movement independently of sleeve 38 over part of their stroke and in unison with sleeve 38 over another part of their stroke. A coil spring 41 is arranged within cylinder 34 with one end against end 42 of cylinder 34 and the other end against piston 39. Spring 41 biases piston 39 to the right as shown in FIG. 5. Sleeve 38 is provided with a pair of shoulders 43 and 44 extending laterally within sleeve 38 forming limits for the movement of piston 39 relative to sleeve 38. Thus, piston 39 can move to the right as shown in FIG. 5 independently of sleeve 38 until it engages shoulder 43 at which time it moves in unison with sleeve 38. Piston 39 can also move to the left independently of sleeve 38 until it engages shoulder 44 at which time it moves in unison with sleeve 38. Sleeve 38 is also provided with an extension 45 which stops the movement of sleeve 38 to the right when it engages cap 46 which forms a bearing for piston rod 40 and closes the right end of cylinder 34.

The structure shown in FIG. 5 automatically and continuously raises and lowers the deflection plate 15 to provide a varying water flow pattern on a cyclic bases as long as pump means 26 operates. Pump means 26 supplies water under pressure through pipeline 37 at the same time it is supplying water to housing 10. Water under pressure in pipeline 37 drives sleeve 38 and piston 39 to the left against the bias of spring 41. Movement of sleeve 38 to the left uncover exhaust port 36 which exhaust the water under pressure in cylinder 34. The exhausting of water from cylinder 34 permits spring 41 to overcome the water pressure in cylinder 34 and to force sleeve 38 and piston 39 to the right thereby covering exhaust port 36. The covering of exhaust port 36 causes the build up of water pressure on the right side of piston 39 and the movement again of sleeve 38 and piston 39 to the left. This reciprocal action of sleeve 38 and piston 39 continues causing the lowering and raising of shaft 14 and deflection plate 15 resulting in a cyclic variation of the water display and aerating condition of the water pumped through the cyclindrical housing 10.

In the modification shown in FIG. 4 the crankshaft or lever arm 16 when moved to one of its various positions causes a lateral shift of one end of the axis of shaft 14 relative to the axis of housing 10'. Since bearing structure 19' of shaft 14 is fixed the shifting and flexing of shaft 14 during movement causing a binding action of shaft 14 in the bearing structure 19'. This amount of binding is desirable since it holds shaft 14 and deflection plate 15 in a given position during the flow of water under pressure through housing 10' without the need of a latch mechanism. Shaft 14 being relatively small in diameter and resilient flexes readily when needed to permit rapid setting and resetting of the nozzle structure of the aerator. It is also readily apparent that the structure shown in FIG. 4 may be adapted for automatic cyclic operation by the application of the cyclic structures shown in FIGS. 2 and 5 to shaft 20 of FIG. 4.

Although but a few embodiments of the present invention have been described, it will be apparent to those skilled in the art that various changes and modifications may be made herein without departing from the spirit of the invention or from the scope of the appended claim.

What is claimed is:

A fount aerator comprising in combination a cylindrical housing having an open end, means for mounting said housing on its end so that the longitudinal axis of said housing is substantially vertically arranged, a shaft rotatably mounted within said housing, a deflection plate mounted on said shaft within said housing adjacent said open end for rotation therewith, said plate being arranged transversely to the longitudinal axis of said shaft, a rack gear extending outwardly of said housing and threadedly connected to said shaft for rotating said shaft to move said plate axially of said housing, a fluid motor connected to said rack gear for reciprocal movement thereof, pump means connected to said housing for forcing water past said plate and out of said housing and for actuating said fluid motor, said plate deflecting the water into various displays depending on the position of said plate relative to said housing.

References Cited by the Examiner

UNITED STATES PATENTS

| | | | |
|---|---|---|---|
| 1,143,293 | 6/1915 | Luehrs | 239—456 X |
| 1,416,401 | 5/1922 | Dudley | 239—456 X |
| 3,010,519 | 11/1961 | Gillespie. | |
| 3,093,967 | 6/1963 | Lerwick | 239—513 |
| 3,116,348 | 12/1963 | Walker | 239—506 X |
| 3,194,014 | 7/1965 | Wilson | 239—513 |

FOREIGN PATENTS 14,738    1910    Great Britain.

M. HENSON WOOD, Jr., *Primary Examiner.*

EVERETT W. KIRBY, *Examiner.*